(12) United States Patent
Kira et al.

(10) Patent No.: US 9,294,673 B2
(45) Date of Patent: Mar. 22, 2016

(54) IMAGE GENERATION METHOD, IMAGE DISPLAY METHOD, STORAGE MEDIUM STORING IMAGE GENERATION PROGRAM, IMAGE GENERATION SYSTEM, AND IMAGE DISPLAY DEVICE

(71) Applicant: NINTENDO CO., LTD., Kyoto (JP)

(72) Inventors: Satoshi Kira, Kyoto (JP); Shinya Saito, Kyoto (JP); Yasushi Mikawa, Tokyo (JP); Mitsuhiro Kanaya, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 456 days.

(21) Appl. No.: 13/870,371

(22) Filed: Apr. 25, 2013

(65) Prior Publication Data

US 2014/0132705 A1 May 15, 2014

(30) Foreign Application Priority Data

Nov. 9, 2012 (JP) .................................. 2012-247336

(51) Int. Cl.
*H04N 5/232* (2006.01)
*H04N 13/00* (2006.01)
*H04N 13/02* (2006.01)

(52) U.S. Cl.
CPC ....... *H04N 5/23238* (2013.01); *H04N 13/0011* (2013.01); *H04N 13/0242* (2013.01); *H04N 13/0275* (2013.01)

(58) Field of Classification Search
CPC ..................................................... H04N 5/232
See application file for complete search history.

(56) References Cited

U.S. PATENT DOCUMENTS

| 2004/0105597 | A1 | 6/2004 | Lelescu et al. | |
| 2010/0208032 | A1* | 8/2010 | Kweon | G03B 37/00 348/36 |
| 2010/0295945 | A1* | 11/2010 | Plemons | B60R 1/00 348/148 |

FOREIGN PATENT DOCUMENTS

JP  2004-187298  7/2004

* cited by examiner

*Primary Examiner* — Jefferey Harold
*Assistant Examiner* — Justin Sanders
(74) *Attorney, Agent, or Firm* — Nixon & Vanderhye, P.C.

(57) ABSTRACT

A left panorama image and a right panorama image respectively captured by a left panorama camera and a right panorama camera are acquired. A rearward image area, of a rearward area, included in the right panorama image and captured by the right panorama camera is synthesized to the left panorama image, instead of a rearward image area, of the rearward area, included in the left panorama image and captured by the left panorama camera, to generate a left-eye image. The rearward image area, of the rearward area, included in the left panorama image and captured by the left panorama camera is synthesized to the right panorama image, instead of the rearward image area, of the rearward area, included in the right panorama image and captured by the right panorama camera, to generate a right-eye image.

14 Claims, 9 Drawing Sheets

F I G. 1
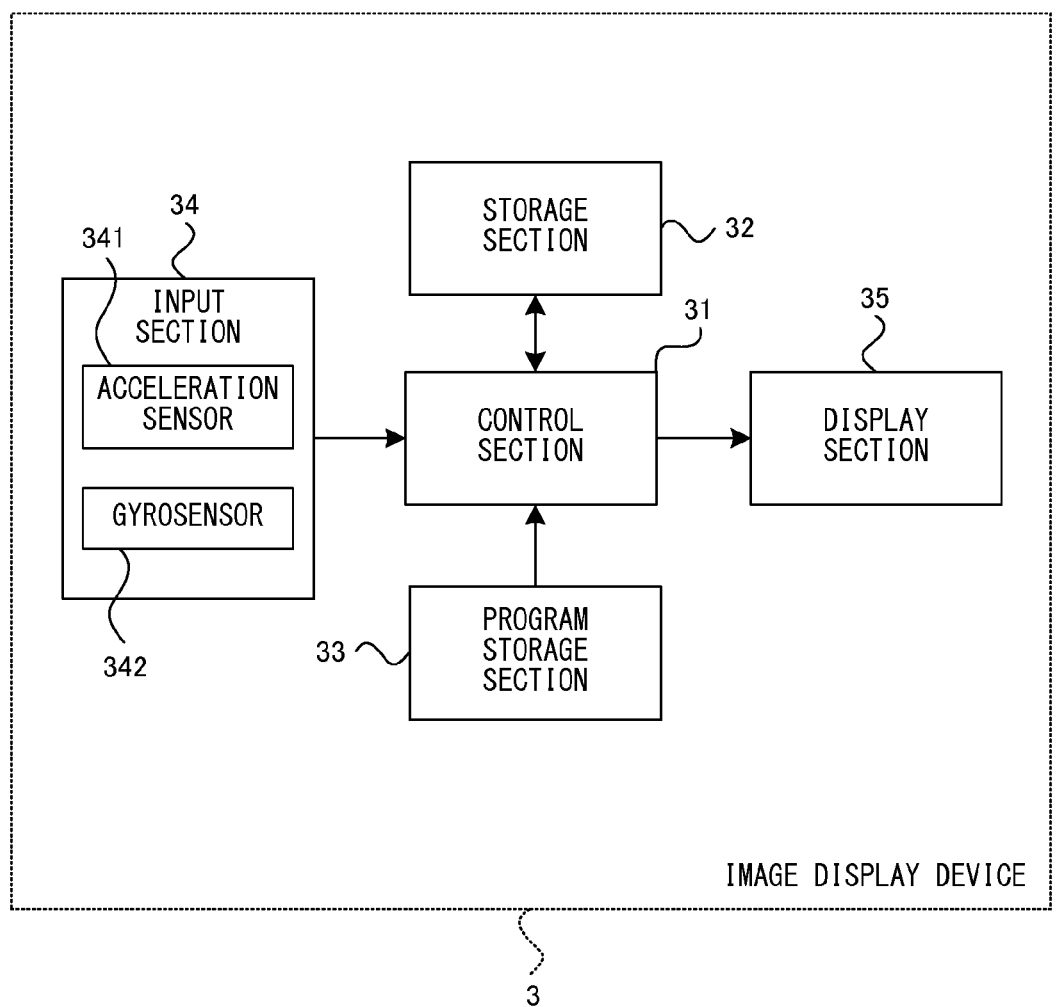

F I G. 3
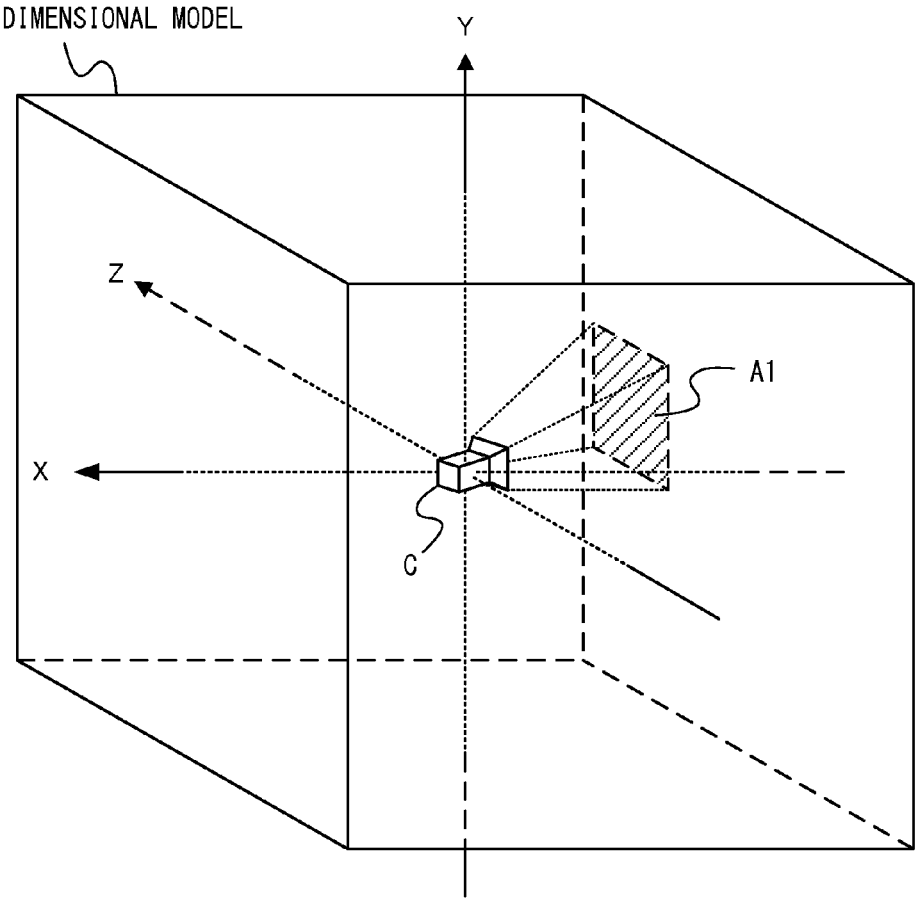

F I G. 7
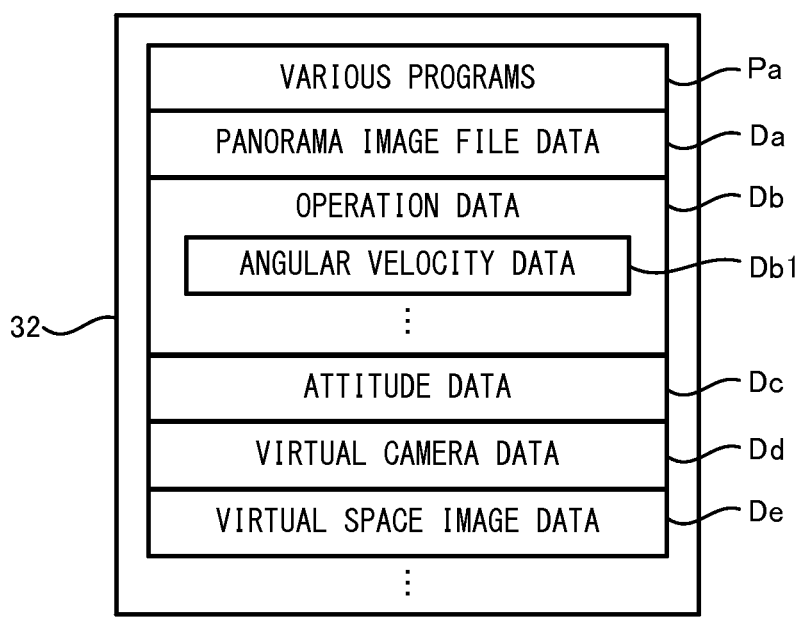

IMAGE GENERATION METHOD, IMAGE DISPLAY METHOD, STORAGE MEDIUM STORING IMAGE GENERATION PROGRAM, IMAGE GENERATION SYSTEM, AND IMAGE DISPLAY DEVICE

CROSS REFERENCE TO RELATED APPLICATION

The disclosure of Japanese Patent Application No. 2012-247336 filed on Nov. 9, 2012 is incorporated herein by reference.

FIELD

The technology described herein relates to an image generation method, an image display method, a storage medium storing an image generation program, an image generation system, and an image display device; and specifically, for example, to an image generation method, a storage medium storing an image generation program and an image generation system for generating a stereoscopic panorama image; and an image display method and an image display device capable of displaying a stereoscopic panorama image.

BACKGROUND AND SUMMARY

Conventionally, there is an image processing device for displaying a part of a panorama image or an omnidirectional image on a display device.

However, the above-described image processing device cannot acquire a stereoscopic panorama image.

Accordingly, an object of the example embodiment is to provide an image generation method, an image display method, a storage medium storing an image generation program, an image generation system and an image display device capable of generating and/or displaying a stereoscopic panorama image.

In order to achieve the above object, the example embodiment may adopt, for example, the following structures. It is understood that for interpreting the recitations of the claims, the range thereof is to be interpreted only based on the recitations of the claims, and that in the case where the recitations of the claims are contradictory to the description of the specification, the recitations of the claims are given priority.

The present disclosure provides one structural embodiment of an image generation method for generating a stereoscopic panorama image. The image generation method comprises acquiring a left panorama image and a right panorama image respectively captured by a left panorama camera and a right panorama camera which are located so as to be away from each other by a prescribed distance; synthesizing a rearward image area, of a rearward area, included in the right panorama image and captured by the right panorama camera to the left panorama image, instead of a rearward image area, of the rearward area, included in the left panorama image and captured by the left panorama camera; synthesizing the rearward image area, of the rearward area, included in the left panorama image and captured by the left panorama camera to the right panorama image, instead of the rearward image area, of the rearward area, included in the right panorama image and captured by the right panorama camera; and generating the stereoscopic panorama image using the synthesized left panorama image as a left-eye image and using the synthesized right panorama image as a right-eye image.

The "panorama moving image" described above may have an angle of field which is equal to or greater larger than 180° in one of an up-down direction and a left-right direction. Further, the "panorama moving image" may have an angle of field of 360° in one of the directions. In the other direction, the "panorama moving image" may have an angle of field which is equal to or greater than that of the moving image to be displayed on the first display device. Further, the "panorama moving image" may have an angle of field which is equal to or greater than twice the angle of field of the moving image, equal to or greater than 120°, equal to or greater than 150°, or 180°.

According to the above, the phenomenon that the parallax is inverted in a panorama image of a rearward area captured by the left panorama camera and the right panorama camera can be prevented, and even such a panorama image of the rearward area can be displayed stereoscopically.

The image generation method may further comprise synthesizing a rightward image area, of a rightward area, included in the right panorama image and captured by the right panorama camera to the left panorama image, instead of a rightward image area, of the rightward area, included in the left panorama image and captured by the left panorama camera; and synthesizing a leftward image area, of a leftward area, included in the left panorama image and captured by the left panorama camera to the right panorama image, instead of a leftward image area, of the leftward area, included in the right panorama image and captured by the right panorama camera. In this case, the stereoscopic panorama image may be generated using, as the left-eye image, the left panorama image including the synthesized rightward image area of the rightward area captured by the right panorama camera and using, as the right-eye image, the right panorama image including the synthesized leftward image area of the leftward area captured by the left panorama camera.

According to the above, even when in the leftward area or the rightward area where the image is not easily viewed stereoscopically due to a relatively small parallax, a panorama image captured by the panorama camera on the different side is used, the influence on the stereoscopic appearance of the displayed panorama image is small. Therefore, in the case where, for example, the image-capturing area where the field of view is blocked by the panorama camera on the different side or another device is at least a part of the leftward area or the rightward area, the panorama image can be displayed with the dead angle area being removed.

The image generation method may further comprise synthesizing, instead of a right dead angle image area which is included in the left panorama image and in which an image of the right panorama camera is captured, an image area which is included in the right panorama image and corresponds to the right dead angle image area to the left panorama image; and synthesizing, instead of a left dead angle image area which is included in the right panorama image and in which an image of the left panorama camera is captured, an image area which is included in the left panorama image and corresponds to the left dead angle image area to right panorama image. In this case, the stereoscopic panorama image may be generated using, as the left-eye image, the left panorama image including the synthesized image area corresponding to the right dead angle image area and using, as the right-eye image, the right panorama image including the synthesized image area corresponding to the left dead angle image area.

According to the above, in an image-capturing area where the field of view is blocked by the panorama camera on the different side, an image of the image-capturing area captured by the panorama camera on the different side is used. Thus, the dead angle area in the panorama image can be removed.

A structural example of an image display method according to the example embodiment may comprise displaying, on a display device, the stereoscopic panorama image generated by the above-described image generation method.

According to the above, a stereoscopic panorama image can be displayed, and even a panorama image of the rearward area can be displayed stereoscopically.

The image display method may further comprise setting a display range, of the stereoscopic panorama image, which is to be displayed on the display device in accordance with an attitude of the display device. In this case, the set display range of the stereoscopic panorama image may be displayed on the display device.

According to the above, the range of the panorama image to be displayed is changed in accordance with the attitude of the display device. Therefore, the user can view the panorama image by making an operation intuitively.

The example embodiment may be implemented in the form of a non-transitory computer-readable storage medium storing an image generation program for allowing a computer to execute each of the above-described operations, an image generation system including a unit for performing each of the above-described operations, or an image display device for displaying an image generated by the above-described operations.

According to the example embodiment, the phenomenon that the parallax is inverted in a panorama image of a rearward area captured by a left panorama camera and a right panorama camera can be prevented, and even such a panorama image of the rearward area can be displayed stereoscopically.

These and other objects, features, aspects and advantages of the example embodiment will become more apparent from the following detailed description when taken in conjunction with the accompanying drawings.

BRIEF DESCRIPTION OF THE DRAWINGS

FIG. 1 is a block diagram showing a non-limiting example of an image display device 3;

FIG. 3 shows a non-limiting example of method for determining a display range in accordance with an attitude of the image display device 3;

FIG. 7 shows a non-limiting example of main data and programs stored on a storage section 32 of the image display device 3;

DETAILED DESCRIPTION OF NON-LIMITING EXAMPLE EMBODIMENTS

Figure 2:
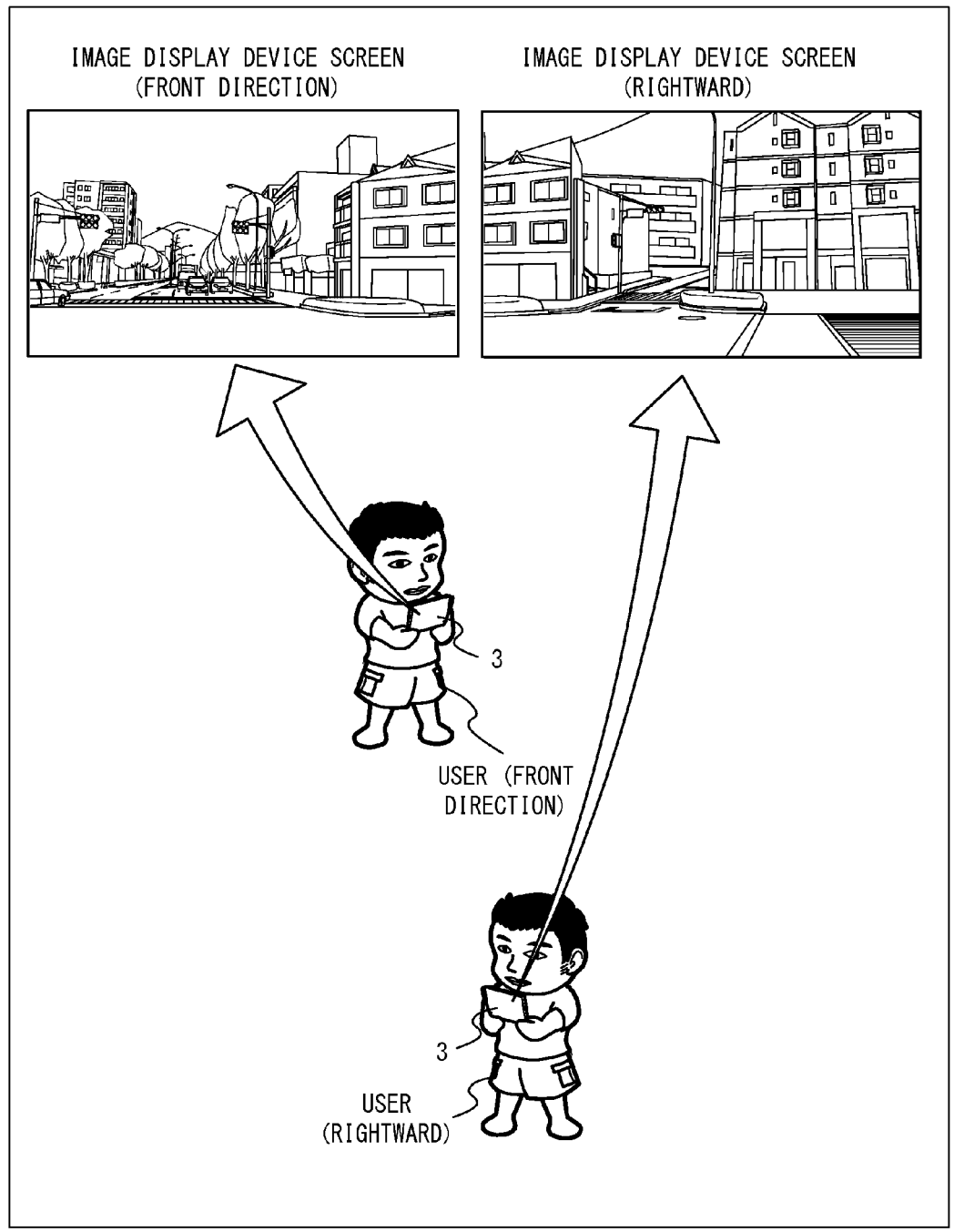
FIG. 2 shows a non-limiting example of panorama moving images (images) displayed by the image display device 3.

With reference to FIG. 1, an image display device according to an example will be described. For example, an image display device 3 can execute an image display program or a game program stored on a storage medium such as, for example, a replaceable optical disc or memory card or received from another device. In the example embodiment, the image display device 3 generates an image (panorama image) and displays the image on a display device (display section 35). The image display device 3 may be a device such as a general personal computer, a non-portable game device, a mobile phone, a mobile game device, a PDA (Personal Digital Assistant) or the like. FIG. 1 is a block diagram showing an example of structure of the image display device 3.

As shown in FIG. 1, the image display device 3 includes a control section 31, a storage section 32, a program storage section 33, an input section 34, and the display section 35. The image display device 3 may be formed of at least one device which includes an information processing device including at least the control section 31 and another device.

The control section 31 is an information processing unit (computer) for executing various types of information processing operations, and is, for example, a CPU. The control section 31 has a function for executing various types of information processing operations, for example, a processing operation in accordance with an operation made on the input section 34 by a user. For example, the CPU executes a prescribed program, and thus various functions of the control section 31 are realized.

The storage section 32 stores various types of data usable by the control section 31 to execute the above-described information processing operations. The storage section 32 is, for example, a memory accessible by the CPU (control section 31).

The program storage section 33 stores a program. The program storage section 33 may be any storage device (storage medium) accessible by the control section 31. For example, the program storage section 33 may be a storage device provided in the information display device 3 including the control section 31, or a storage medium detachably mountable on the information display device 3 including the control section 31. Alternatively, the program storage section 33 may be a storage device connected to the control section 31 via a network (server, etc.). The control section 31 (CPU) may read a part of, or the entirety of, the game program at an appropriate timing onto the storage section 32 and execute the read program.

The input section 34 is an input device operable by the user. The input section 34 may be any input section. For example, the input section 34 includes an acceleration sensor 341 and a gyrosensor 342. The acceleration sensor 341 detects an acceleration of the image display device 3 in a prescribed axial direction (e.g., directions of three axes; may be a direction of at least one axis). The gyrosensor 342 detects an angular velocity of a rotation of the image display device 3 about a prescribed axial direction (e.g., directions of three axes; may be a direction of at least one axis). The acceleration sensor 341 and the gyrosensor 342 are sensors for detecting information usable for calculating an attitude of the image display device 3 (information usable for calculating or estimating the attitude). In other embodiments, the attitude of the image display device 3 may be calculated by any method, and may be calculated by use of a sensor other than the above-described sensors or by use of a camera capable of capturing an image of the image display device 3. The image display device 3 may include an operation section such as a slide pad, an analog stick, a cross key, buttons or the like as the input section 34.

The display section 35 displays an image as instructed by the control section 31. For example, the display section 35 is a display device utilizing LCD (Liquid Crystal Display), EL (electroluminescence) or the like. The display section 35 is a display device capable of displaying a stereoscopic image. The display section 35 is capable of displaying an image for left eye and an image for right eye by use of substantially the same display area. Specifically, the display section 35 displays left-eye images and right-eye images alternately in a lateral direction in prescribed units (e.g., row by row). For example, the display section 35 can display a naked-eye stereoscopic image. In an example, the display section 35 may be of a parallax barrier system or of a lenticular system, by which the left-eye images and the right-eye images displayed alternately in the lateral direction are distinguishable as being for the left eye and the right eye, respectively. In the case where the display section 35 is of a parallax barrier system, the display section 35 uses a parallax barrier to allow the left eye of the user to recognize the left-eye images and allow the right eye of the user to recognize the right-eye images, and thus can display an image which appears to be stereoscopic to the user (stereoscopic image). The display section 35 may not be a display device capable of displaying a naked-eye stereoscopic image, and may provide a stereoscopic image by any other method. For example, the display section 35 may provide a stereoscopic image by use of a polarizing filter method, a time division method, an anaglyph method or the like.

Now, with reference to FIG. 2 and FIG. 3, a processing operation executed by the image display device 3 for displaying a panorama image (reproducing a panorama moving image) will be described. FIG. 2 shows an example of panorama image (panorama moving image) displayed on the image display device 3. FIG. 3 shows an example of method for determining a display range in accordance with the attitude of the image display device 3.

A "panorama image" is an image having a viewing angle which is wider than that of an image displayed on a display device. Namely, a panorama image may be typically considered as an image, a part of which is displayed on a display device and a line-of-sight direction of which is changed when the display range thereof is changed. In the example embodiment, a panorama image having an omnidirectional (360°) viewing angle in an up-down direction and a left-right direction is used (see FIG. 3). However, a panorama image may have a dead angle, and may have a viewing angle of, for example, about 180°. In the example embodiment, a panorama image is a stereoscopic actual image (image of an actual object) captured by two panorama cameras. Alternatively, a panorama image may be partially or entirely a virtual image (CG image).

In the example embodiment, as the reproduction of a panorama moving image proceeds, left-eye panorama images and right-eye panorama images, each pair of which forms a frame of the stored panorama moving image, are read at a cycle of a predetermined time length and sequentially displayed on the display section 35. Namely, the left-eye panorama images and the right-eye panorama images are sequentially displayed on the display device to reproduce a stereoscopic panorama moving image. Specifically, a plurality of pairs of left-eye panorama images and right-eye panorama images included in the panorama moving image are each assigned a frame number, and the panorama image pairs are displayed in the order of the frame number. In an example, in the case where a panorama moving image which is captured while a point of view (e.g., two panorama cameras) is moved in a predetermined space (e.g., real world) as the time passes is displayed, the point of view of the panorama moving image is moved as the time passes during the reproduction. For example, as shown in FIG. 2, a panorama image of an environment as seen from a position on a street is displayed, and a panorama moving image proceeding on the street (panorama moving image, the point of view of which moves along the street) is reproduced. In another example, in the case where a panorama moving image which is captured while the point of view is not moved in a predetermined space (i.e., panorama moving image which is obtained by fixed-point image capturing) is displayed, the state of the environment around the point of view is changed as the time passes during the reproduction.

A display range displayed on the image display device 3 is changed in accordance with the attitude of the image display device 3. For example, in FIG. 2, the attitude of the image display device 3 is directed in the front direction and is directed rightward with respect to the front direction. The display ranges of the panorama image displayed on the image display device 3 are obtained when the line-of-sight is directed in the proceeding direction (front direction) and is rightward with respect to the proceeding direction. In this manner, the image display device 3 determines the display range of the panorama moving image to be displayed thereon, based on an input made on the input device (image display device 3). Owing to this, the user can freely change the line-of-sight direction (display range) by making an operation on the image display device 3 (operation of changing the attitude) while viewing the panorama moving image. In other embodiments, the display range may be determined by any method as long as being changed in accordance with an operation made by the user.

In the example embodiment, as shown in FIG. 3, a three dimensional model is located in a virtual space, and a virtual camera C is located at a prescribed position inside the three dimensional model (in the example embodiment, a position which is substantially the center of the three dimensional model). For generating an image of the three dimensional model as viewed from the virtual camera C (image of inner side surfaces of the three dimensional model), image rendering is performed as texture on the inner side surfaces of the three dimensional model. Thus, the panorama image to be displayed on the terminal device 2 is generated. Specifically, the panorama image is pasted as texture on the inner side surfaces of the three dimensional model, such that the reference direction for capturing the panorama moving image is the reference direction of the three dimensional model. Of the panorama image, a visual field of the vertical camera C (hatched area A1 in FIG. 3) is the display range. In the example embodiment, the three dimensional model is cubical. Alternatively, the three dimensional model may have any shape, for example, a spherical shape or a columnar (e.g., cylindrical) shape.

In FIG. 3, the attitude of the virtual camera C for generating an image to be displayed on the image display device 3 is controlled in accordance with the attitude of the image display device 3. Owing to this, the display range can be changed in accordance with the attitude of the image display device 3. Hereinafter, an example of controlling the attitude of the virtual camera C in accordance with the attitude of the image display device 3 will be described.

First, as initial setting, a reference attitude of the image display device 3 is set. For example, the attitude of the image display device 3 at the start of, or at a predetermined timing before the start of, the reproduction of the panorama moving image is set as the reference attitude of the image display device 3. Specifically, the attitude of the image display device 3 at the start of the reproduction of the panorama moving image may be set as the reference attitude; the attitude of the image display device 3 when the user makes a prescribed operation before the start of the reproduction of the panorama moving image may be set as the reference attitude; a predefined fixed attitude of the image display device 3 may be set as the reference attitude; or one of a plurality of predefined fixed attitudes of the image display device 3 may be selected by the user as the reference attitude. In the example embodiment, the attitude of the image display device 3 is calculated based on an output value from the gyrosensor 342, and therefore, setting of the reference attitude is resetting of the attitude value calculated by the gyrosensor 342. Alternatively, for setting the reference attitude of the image display device 3, an appropriate processing operation may be executed depending on the type of the sensor.

As initial setting, an initial attitude of the virtual camera C is set. For example, the initial attitude of the virtual camera C is set such that the line-of-sight direction (z-axis positive direction) of the virtual camera C matches a Z-axis positive direction of the virtual space (reference direction of the three dimensional model and the reference direction for capturing the panorama moving image (front direction)), a leftward direction (x-axis positive direction) of the virtual camera C matches an X-axis positive direction of the virtual space, and an upward direction (y-axis positive direction) of the virtual camera C matches a Y-axis positive direction of the virtual space.

In accordance with a change of the attitude of the image display device 3 with respect to the reference attitude (in the example embodiment, direction and amount of rotation about an xt axis, which is the left-right direction of the image display device 3 at the reference attitude, and about a yt axis, which is the up-down direction of the image display device 3 at the reference attitude), the attitude of the virtual camera C is changed from the initial attitude (typically, the virtual camera C is rotated about the x axis and y axis of the virtual camera C at the initial attitude, namely, about the X axis and the Y axis, in the same direction by the same amount as those of the rotation of the image display device 3 about the xt axis and the yt axis, respectively). In other embodiments, in accordance with a change of the attitude of the image display device 3 with respect to the reference attitude about three axes (i.e., the xt axis, the yt axis, and a zt axis, which is a front-rear direction of the image display device 3), the attitude of the virtual camera C may be changed, namely, rotated, from the initial attitude about the X axis, the Y axis and Z axis in the same direction by the same amount as those of the rotation of the image display device 3 about the xt axis, the yt axis, and the zt axis, respectively).

For displaying a left-eye panorama image and a right-eye panorama image to display a stereoscopic panorama image on the display section 35, the above-described three dimensional model and the above-described virtual camera are provided for each of the left eye and the right eye. Regarding the left-eye three dimensional model, a left-eye panorama image is rendered as texture on the inner surfaces thereof, and the left-eye virtual camera is located at the above-described position with the above-described attitude. Thus, the operation of the left-eye virtual camera is controlled. Regarding the right-eye three dimensional model, a right-eye panorama image is rendered as texture on the inner surfaces thereof, and the right-eye virtual camera is located at the above-described position with the above-described attitude. Thus, the operation of the right-eye virtual camera is controlled. An image obtained by the left-eye virtual camera thus located and an image obtained by the right-eye virtual camera thus located are displayed on the display section 35 as a left-eye image and a right-eye image, respectively. Thus, a stereoscopic panorama image (panorama moving image) can be displayed.

Figure 4:
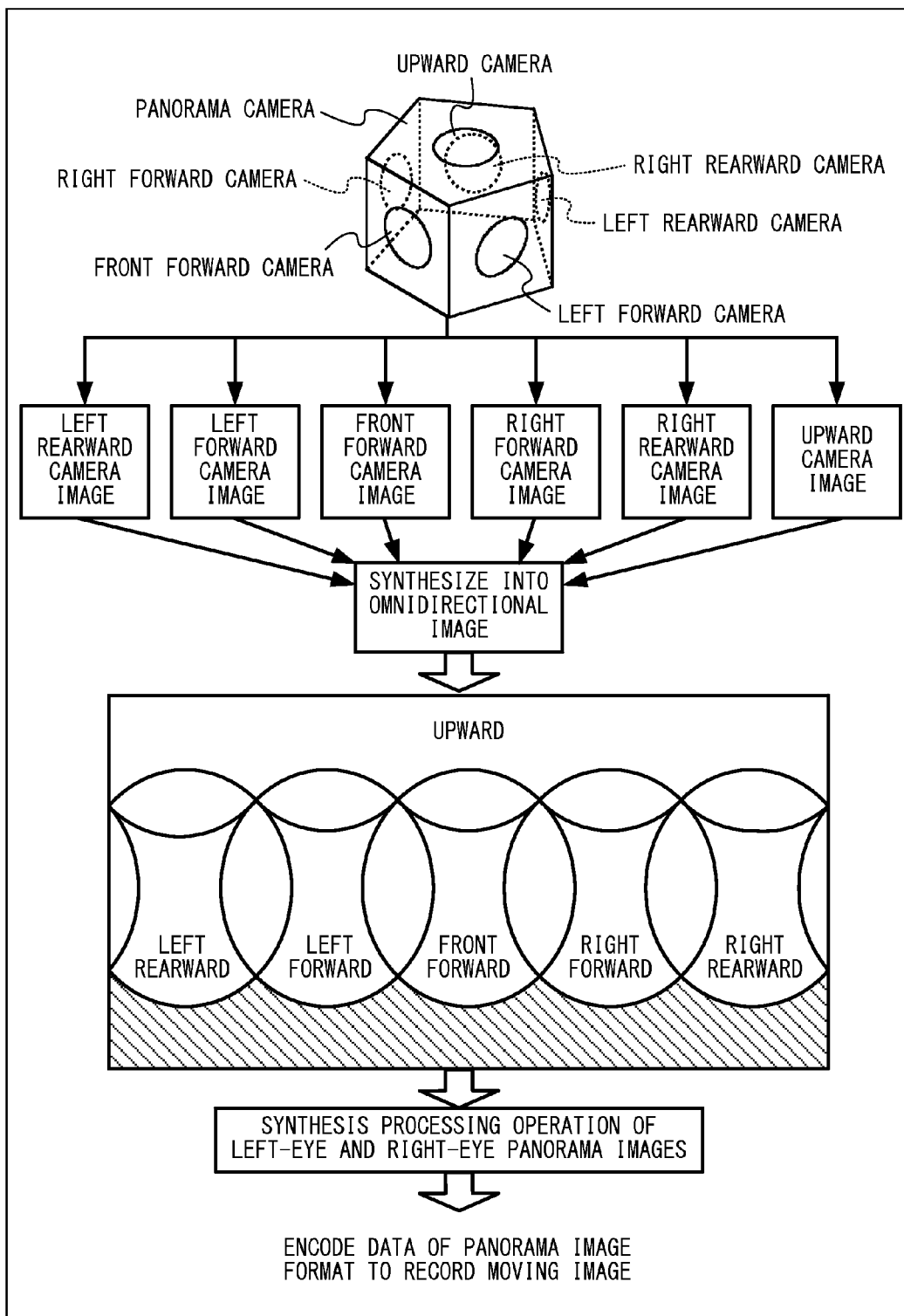
FIG. 4 shows a non-limiting example of flow of a processing operation of capturing a panorama moving image including panorama images, each of which forms a frame, and encoding and storing the panorama moving image.
Figure 5:
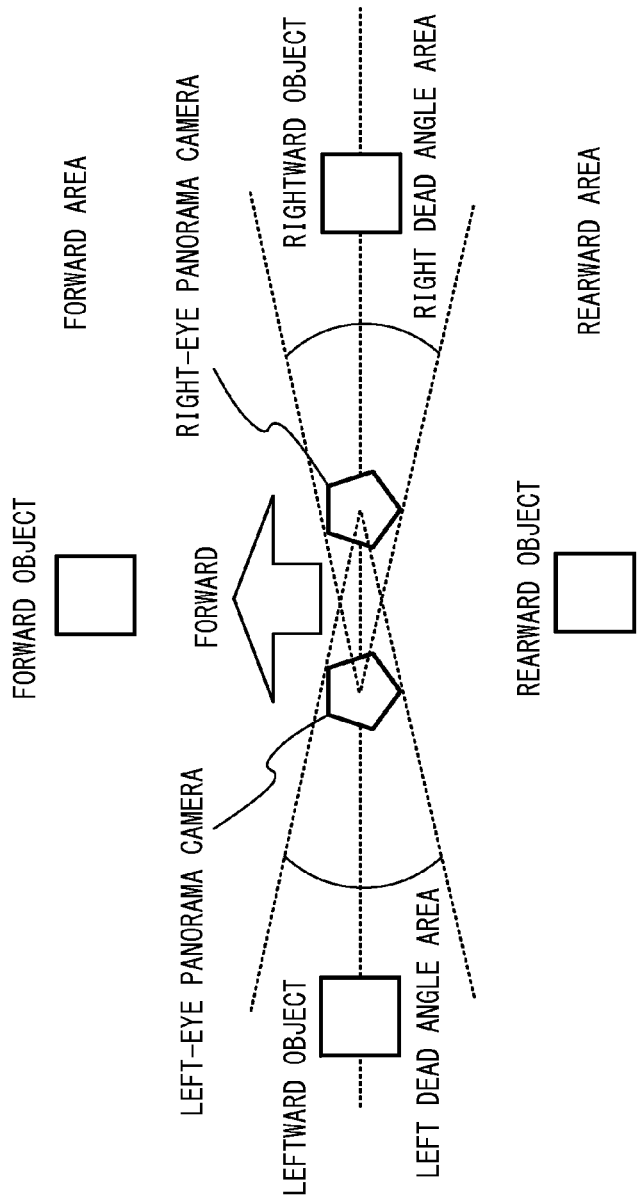
FIG. 5 shows a non-limiting example of locating arrangement of panorama cameras for capturing a stereoscopic panorama moving image and a non-limiting example of image-capturing areas of such cameras.
Figure 6:
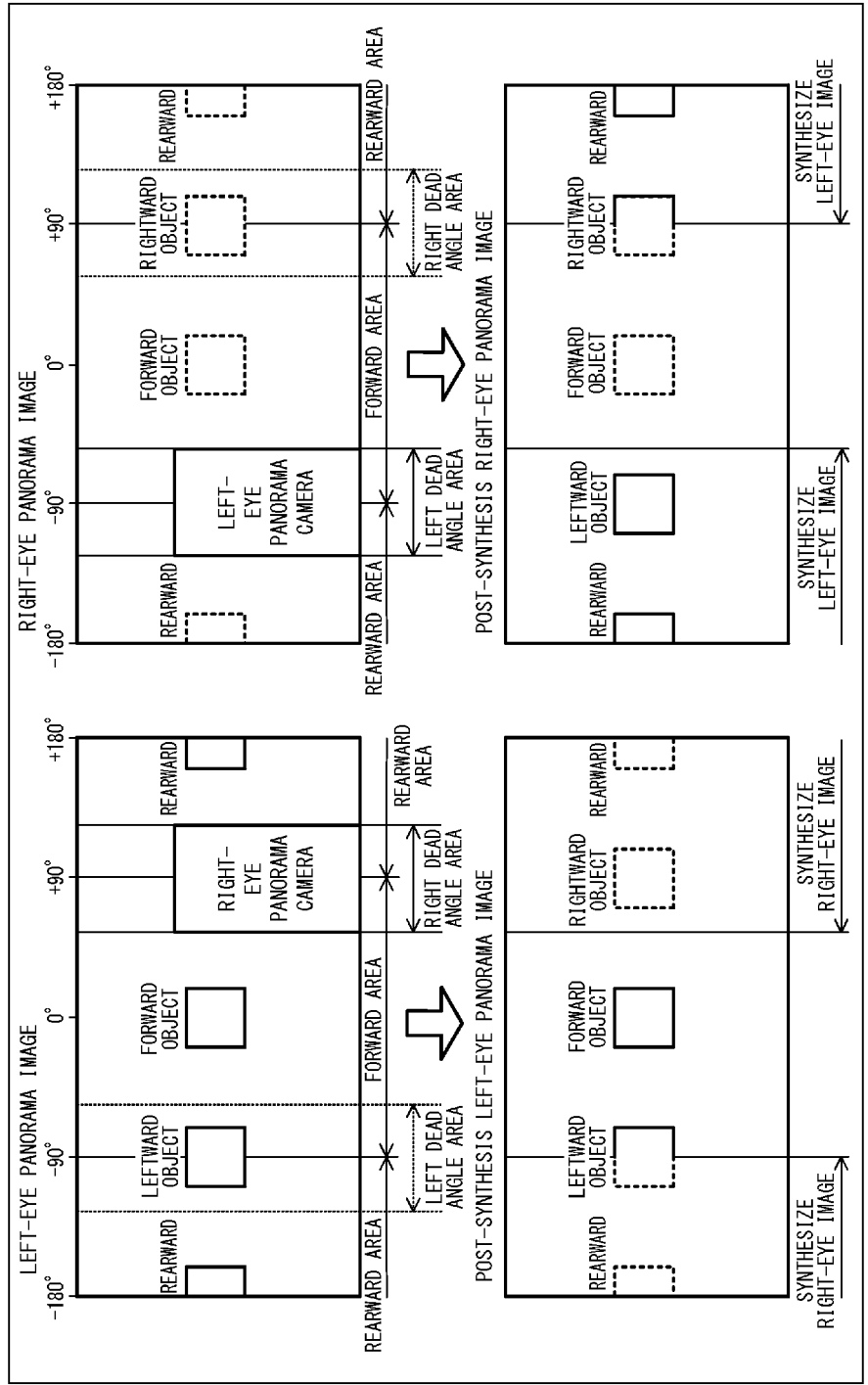
FIG. 6 shows a non-limiting example of synthesis processing operation performed on a captured left-eye panorama image and a captured right-eye panorama image.

Now, with reference to FIG. 4 through FIG. 6, a flow of a processing operation of capturing and storing a panorama moving image will be described. FIG. 4 shows an example of flow of a processing operation of capturing a panorama moving image including panorama images, each of which forms a frame, and encoding and storing the panorama moving image. FIG. 5 shows an example of locating arrangement of panorama cameras for capturing a stereoscopic panorama moving image and an example of image-capturing areas of such cameras. FIG. 6 shows an example of synthesis processing operation performed on the captured left-eye panorama image and the captured right-eye panorama image.

As shown in FIG. 4, in an example, for capturing a panorama moving image of a real world, a panorama camera including a plurality of image-capturing cameras, the image-capturing directions of which are fixed to each other, is used. For example, six image-capturing cameras are provided at fixed positions. The image-capturing directions of these cameras are, respectively, directions radiating from side surfaces and a top surface of a support member having a pentagonal prism shape. The six image-capturing cameras capture an image of the real world while moving in a forward direction, which is the direction in which one of the side surfaces is directed. The image-capturing camera provided on the side surface set as the forward direction (i.e., the side surface directed in the proceeding direction while the cameras capture the image while moving) is labeled as a "front forward camera". The image-capturing camera having the left forward direction as the image-capturing direction while moving is labeled as a "left forward camera". The image-capturing camera having the right forward direction as the image-capturing direction while moving is labeled as a "right forward camera". The image-capturing camera having the left rearward direction as the image-capturing direction while moving is labeled as a "left rearward camera". The image-capturing camera having the right rearward direction as the image-capturing direction while moving is labeled as a "right rearward camera". The image-capturing camera having the upward direction as the image-capturing direction while moving is labeled as an "upward camera". As the cameras move, images having the same time axis are obtained by the image-capturing cameras. The image obtained by the front forward camera is labeled as a "front forward camera image". The image obtained by the left forward camera is labeled as a "left forward camera image". The image obtained by the right forward camera is labeled as a "right forward camera image". The image obtained by the left rearward camera is labeled as a "left rearward camera image". The image obtained by the right rearward camera is labeled as a "right rearward camera image". The image obtained by the upward camera is labeled as an "upward camera image".

The above-described structure of the panorama cameras is one example, and another structure may be used, needless to say. A panorama moving image of the real world may be captured by the panorama camera without moving the camera (i.e., by fixed-point image capturing).

Among the images obtained by the image-capturing cameras, images of the same time axis are synthesized into one omnidirectional image (panorama image) by panorama extension. The omnidirectional image used in FIG. 4 is generated as follows. The front forward camera image is placed at a position which is to be the center of the panorama image. The left forward camera image is put to the left of, and synthesized with, the front forward camera image, and the left rearward camera image is put to the left of, and synthesized with, the left forward camera image. The right forward camera image is put to the right of, and synthesized with, the front forward camera image, and the right rearward camera image is put to the right of, and synthesized with, the right forward camera image. Then, the upward camera image is put in an area upper to, and synthesized with, the five synthesized camera images. As an image at an azimuth which is at a dead angle for the camera images (typically, a lower area of the panorama image, which is hatched in FIG. 4), a predetermined image (e.g., a black image) is provided. An omnidirectional image (panorama image) generated by synthesizing images obtained by a plurality of image-capturing cameras may not necessarily have the structure shown in FIG. 4, and may have another structure. A technique for generating a panorama image from images obtained by a plurality of image-capturing cameras is well known and will not be described herein in detail.

Referring to FIG. 5, for capturing a stereoscopic panorama moving image, two panorama cameras as described above are directed forward (e.g., in the proceeding direction) and are located so as to be away from each other by a prescribed gap in the left-right direction. Among the two panorama cameras, the camera located on the left while facing forward acts as a left-eye panorama camera, and the camera located on the right while facing forward acts as a right-eye panorama camera. The two cameras each perform the image-capturing operation and the synthesis processing operation described above to generate a left-eye panorama image and a right-eye panorama image.

As shown in FIG. 5, an area of the real world captured by the left-eye panorama camera and the right-eye panorama camera can be divided into a forward area and a rearward area. Specifically, the an area which is forward to a straight line connecting the left-eye panorama camera and the right-eye panorama camera is the forward area, and an area which is rearward to the straight line is the rearward area. Namely, where the angle of the forward direction (proceeding direction) of the left-eye panorama camera and the right-eye panorama camera is 0°, the forward area is an image-capturing area extending from an angle of 90° in the left direction to an angle of 90° in the right direction with respect to the left-eye panorama camera and the right-eye panorama camera (hereinafter, an angle in the left direction as seen from the forward direction will be represented by a negative value, and an angle in the right direction as seen from the forward direction will be represented by a positive value; in this case, the forward area extends from an angle of −90° to an angle of +90°). The rearward area is an image-capturing area extending from an angle of −180° to an angle of −90° and from an angle of +90° to an angle of +180° with respect to the left-eye panorama camera and the right-eye panorama camera.

When the left-eye panorama camera captures an image of the real world, there is an image-capturing range which is at a dead angle by the right-eye panorama camera, which is located to the right of the left-eye panorama camera (right dead angle area). When the right-eye panorama camera captures an image of the real world, there is an image capturing-range which is at a dead angle by the left-eye panorama camera, which is located to the left of the right-eye panorama camera (left dead angle area).

With reference to FIG. 6, a synthesis processing operation performed on the rearward area, the left dead angle area and the right dead angle area will be described. In order to give the explanation specific, the panorama image of the real world as shown in FIG. 5 will be used. Namely, in this real world, a forward object is located forward to the left-eye panorama camera and the right-eye panorama camera, a rearward object is located rearward to the panorama cameras, a leftward object is located to the left of the panorama cameras, and a rightward object is located to the right of the panorama cameras. In FIG. 6, in order to distinguish which camera has captured the images of which objects, the objects captured by the left-eye panorama camera is represented by the solid-line rectangles, and the objects captured by the right-eye panorama camera is represented by the dashed-line rectangles.

As shown in FIG. 6, in a left-eye panorama image captured by the left-eye panorama camera, an image area corresponding to the image-capturing directions of −90° to +90° is an image area of the forward area, and an image area corresponding to the image-capturing directions of −180° to −90° and +90° to +180° is an image area of the rearward area. In the left-eye panorama image, an image area corresponding to the image-capturing direction, which is a dead angle due to an image of the right-eye panorama being captured, is an image area of the right dead angle area. In a right-eye panorama image captured by the right-eye panorama camera, an image area corresponding to the image-capturing directions of −90° to +90° is an image area of the forward area, and an image area corresponding to the image-capturing directions of −180° to −90° and +90° to +180° is an image area of the rearward area. In the right-eye panorama image, an image area corresponding to the image-capturing direction, which is at a dead angle due to an image of the left-eye panorama camera being captured, is an image area of a left dead angle area.

Now, it is assumed that the user views the panorama image of the rearward area by use of the image display device 3. In this case, the user views the left-eye panorama image with his/her left eye and views the right-eye panorama image with his/her right eye, like in the case of viewing the forward area. However, as is clear from FIG. 5, when the image of the rearward area is captured by the left-eye panorama camera and the right-eye panorama camera, the left-eye panorama camera is located on the right while facing rearward and the right-eye panorama camera is located on the left while facing rearward. This parallax is inverted to the parallax caused when the user views the panorama image. Therefore, the user cannot view the panorama image stereoscopically. In order to avoid such a phenomenon, the synthesis processing operation is performed as follows. Instead of the image area corresponding to the rearward area in the left-eye panorama image, an image of the rearward area captured by the right-eye panorama camera (i.e., image corresponding to the rearward area in the right-eye panorama image before the synthesis processing operation) is pasted. Also, instead of the image area corresponding to the rearward area in the right-eye panorama image, an image of the rearward area captured by the left-eye panorama camera (i.e., image corresponding to the rearward area in the left-eye panorama image before the synthesis processing operation) is pasted. Namely, in the synthesis processing operation, the image areas corresponding to the rearward area in the left-eye panorama image and the right-eye panorama image are exchanged with each other. Owing to this, the above-described phenomenon that the parallax becomes opposite is prevented, and a stereoscopic panorama image of the rearward area can also be displayed. In the case where the image area corresponding to the left dead angle area or the right dead angle area is encompassed in the image to be pasted, the exchanging operation may be performed in the state where such a dead angle area is excluded. Such a dead angle area is treated with the synthesis processing operation described below.

In the right dead angle area of the left-eye panorama image, the field of view is blocked by the right-eye panorama camera. In order to remove such a dead angle area, the synthesis processing operation is performed as follows. Instead of the image area corresponding to the right dead angle area in the left-eye panorama image, an image of the right dead angle area captured by the right-eye panorama camera (i.e., image corresponding to the right dead angle area in the right-eye panorama image before the synthesis processing operation) is pasted. Similarly, in the left dead angle area of the right-eye panorama image, the field of view is blocked by the left-eye panorama camera. The synthesis processing operation is performed as follows. Instead of the image area corresponding to the left dead angle area in the right-eye panorama image, an image of the left dead angle area captured by the left-eye panorama camera (i.e., image corresponding to left dead angle area in the left-eye panorama image before the synthesis processing operation) is pasted. In this manner, for the image-capturing area in which the field of view is blocked by the panorama camera on the different side, an image of the image-capturing area captured by the panorama camera on the different side is used to remove the dead angle area of the panorama image.

In the case where an image captured by the panorama camera on the different side is pasted on the left dead angle area or the right dead angle area as described above, the parallax when the image is displayed so as to stereoscopic becomes 0 in such an area and thus the image cannot be viewed stereoscopically. However, the left dead angle area is an area to the left of the left-eye panorama camera and the right-eye panorama camera, and the right dead angle area is an area to the right of the left-eye panorama camera and the right-eye panorama camera. Namely, parallax is not caused in either of the left dead angle area and the right dead angle area before the synthesis processing operation. Thus, the parallax is not changed from that of the pre-synthesizing panorama image. Therefore, in the synthesis processing operation performed to remove the dead angle area caused by the panorama camera on the different side, an image of the panorama image on the different side may be pasted on a leftward area which is not easily viewed stereoscopically due to a relatively small parallax (e.g., area of −135° to −45°) or a rightward area which is not easily viewed stereoscopically due to a relatively small parallax (e.g., area of +45° to +135°), as well as on the image area corresponding to the image-capturing direction which is a dead angle due to an image of the panorama camera on the different side being captured.

In FIG. 6, image areas corresponding to the forward area, the rearward area, the left dead angle area and the right dead angle area are rectangular areas obtained as a result of dividing the panorama image along a straight line. The shape of each such area is not limited to a rectangular shape. Needless to say, the size and the shape of an image area corresponding to each image-capturing area depend on a technique of synthesizing images obtained by a plurality of image-capturing cameras to generate an omnidirectional image (panorama image) or on the processing load in the synthesis processing operation. The image areas may be obtained as a result of dividing the panorama image along a curved line or a bending line.

Regarding the synthesis processing operation of exchanging the image areas corresponding to the rearward area in the left-eye panorama image and the rearward area in the right-eye panorama image (rearward synthesis processing operation) and the processing operation of pasting an image captured by the panorama camera on the different side on each of the left dead angle area and the right dead angle area (dead angle area synthesis processing operation), only one of these processing operations may be performed. The image areas synthesized to the panorama image on the different side by the rearward area synthesis processing operation or the dead angle area synthesis processing operation are typically continuous to each other. Therefore, such image areas may be treated as one image area, so that the rearward synthesis processing operation and the dead angle area synthesis processing operation may be performed as one processing operation. A border between the images pasted by each synthesis processing operation may be treated with a prescribed image processing operation (e.g., processing operation of blurring the border).

Returning to FIG. 4, the left-eye panorama images and the right-eye panorama images treated with the above-described synthesis processing operations are converted at a cycle of a certain time length by a prescribed method (e.g., moving image data compression encoding method standardized as H.264). Thus, all the left-eye panorama images and the right-eye panorama images are encoded and stored on a storage medium such as an optical disc or the like.

At the time of encoding and storing the panorama moving image, a plurality of panorama images (left-eye panorama images and the right-eye panorama images) included in the panorama moving image are each encoded. The encoding may be performed by use of a compression encoding method other than H.264. Any encoding method is usable for encoding each of the panorama images. For example, a method of compressing each of the panorama images, each of which forms a frame, without inter-frame dependence (e.g., motion JPEG), or a method of compressing a difference between a panorama image in the current frame and a panorama image in the immediately previous frame (e.g., MPEG), may be used. For encoding a panorama moving image by use of a frame prediction encoding method, an encoding method using intra-frame prediction may be used as well as an encoding method using inter-frame prediction.

Now, the processing operation performed by the image display device 3 will be described in detail. First, with reference to FIG. 7, main data used in the processing operation will be described. FIG. 7 shows an example of main data and programs stored on the storage section 32 of the image display device 3.

As shown in FIG. 7, in a data storage area of the storage section 32, panorama image file data Da, operation data Db, attitude data Dc, virtual camera data Dd, virtual space image data De and the like are stored. The storage section 32 may store, in addition to the data shown in FIG. 7, data usable for an application to be executed, other data usable for processing operations and the like. In a program storage area of the storage section 32, a group Pa of various programs included in an information processing program is stored.

As described above with reference to FIG. 4, the panorama image file data Da represents panorama image data of each frame of the panorama moving image obtained by decoding the encoded panorama images. The panorama image data includes data representing a left-eye panorama image and a right-eye panorama image to be pasted as texture on the inner surfaces of the above-described three dimensional models for each frame number n (1, 2, 3, . . . ). For example, the panorama image data is obtained by decoding, by a prescribed method, a stereoscopic panorama moving image, encoded and stored on a predetermined storage medium.

The operation data Db represents a content of operations made on the image display device 3, and includes angular velocity data Db1 and the like. The angular velocity data Db1 represents an angular velocity caused to the image display device 3, which is output from the gyrosensor 342.

The attitude data Dc represents the attitude of the image display device 3 in an actual space, for example, the rotation amount of the image display device 3 from the reference attitude.

The virtual camera data Dd is data regarding the left-eye virtual camera and the right-eye virtual camera respectively located at the center of the left-eye three dimensional model and at the center of the right-eye three dimensional model. For example, the virtual camera data Dd is data on the position, attitude, viewing angle (angle of field) and the like of the left-eye virtual camera and the right-eye virtual camera in the virtual space.

The virtual space image data De represents a left-eye virtual space image of the inner surfaces of the left-eye three dimensional model as viewed from the left-eye virtual camera and represents a right-eye virtual space image of the inner surfaces of the right-eye three dimensional model as viewed from the right-eye virtual camera.

Figure 8:
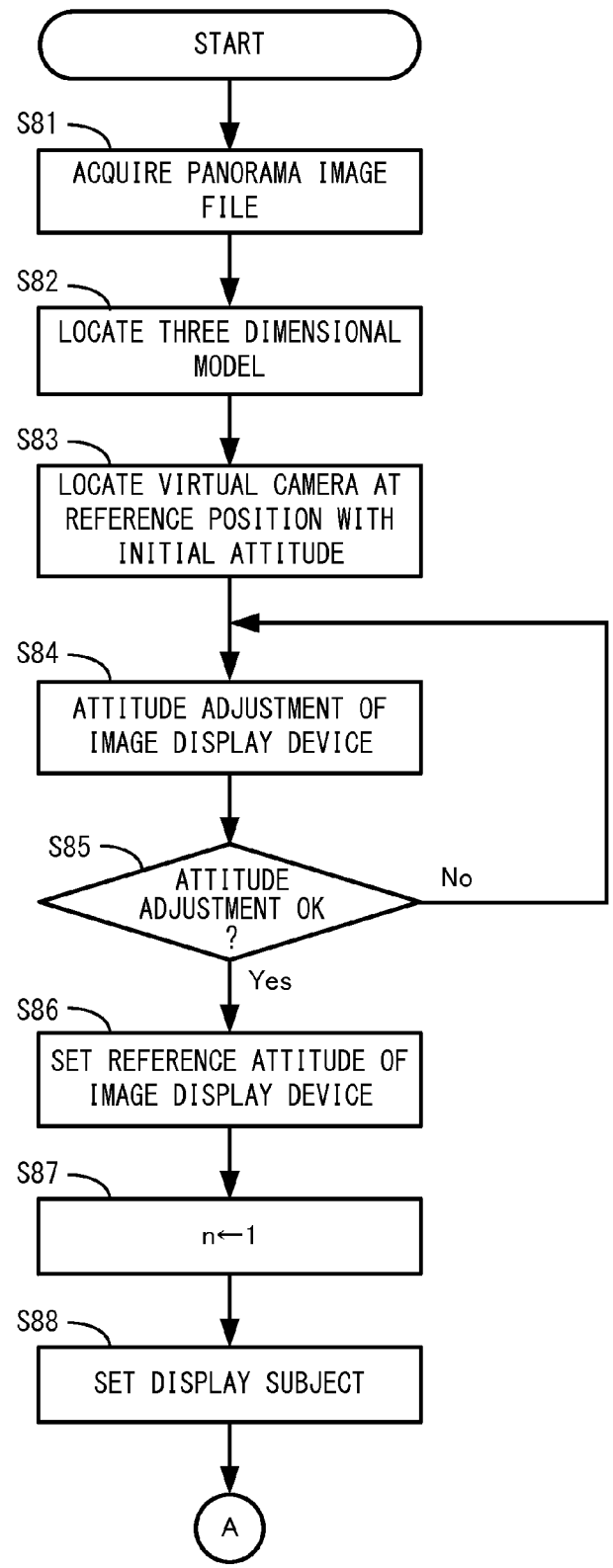
FIG. 8 is a flowchart showing a non-limiting example of first half of a processing operation executable by the image display device 3.
Figure 9:
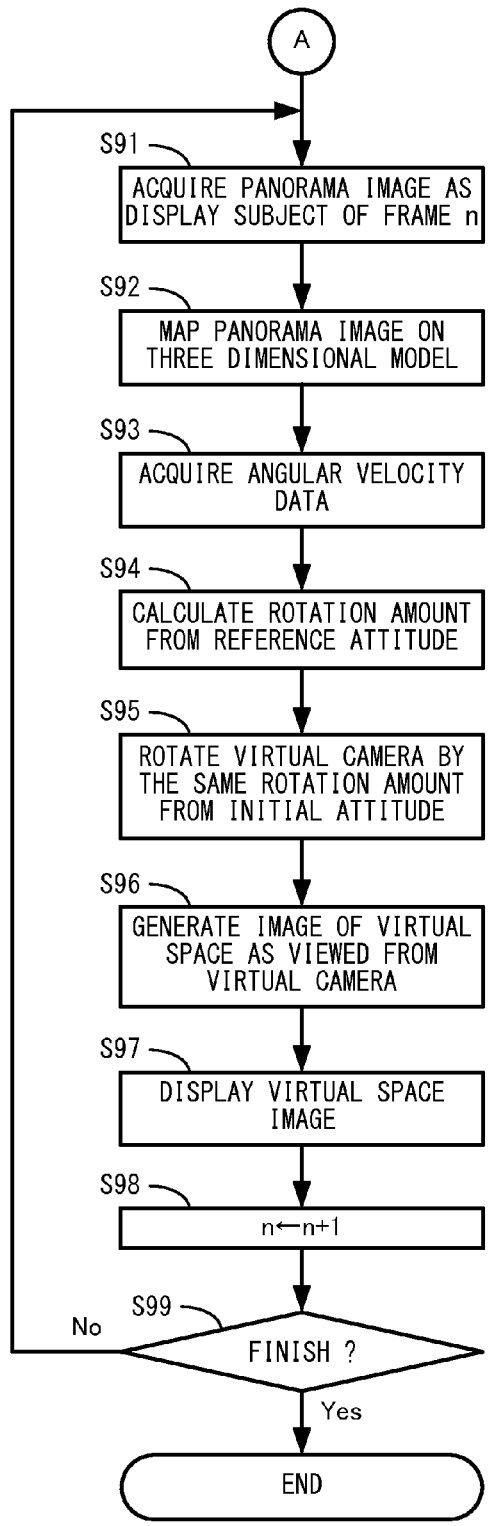
FIG. 9 is a flowchart showing a non-limiting example of second half of the processing operation executable by the image display device 3.

Now, with reference to FIG. 8 and FIG. 9, the processing operation executed by the image display device 3 will be described in detail. FIG. 8 is a flowchart showing an example of first half of a processing operation executed by the image display device 3, and FIG. 9 is flowchart showing an example of second half of the processing operation executed by the image display device 3. With reference to FIG. 8 and FIG. 9, a processing operation of displaying a stereoscopic panorama moving image on the image display device 3 will be mainly described among processing operations executed by the image display device 3. Other processing operations which are not directly related to this processing operation will not be described in detail.

The control section 31 initializes the storage section 32 (memory) and the like, and reads the image display program stored on a nonvolatile memory in the image display device 3 or on an optical disc to the storage section 32. Then, the control section 31 starts execution of the image display program. The flowcharts shown in FIG. 8 and FIG. 9 show the processing operation executed after the above processes are completed.

The steps in the flowcharts shown in FIG. 8 and FIG. 9 merely show an example. The order of the steps may be changed, or a different processing operation may be executed in addition to, or instead of, the processing operation shown in FIG. 8 and FIG. 9, as long as substantially the same results are obtained. In the example embodiment, each step in the flowcharts will be described as being executed by the control section 31. Alternatively, a part of, or the entirety of, the steps in the flowcharts may be executed by a processor other than the control section 31 or a dedicated circuit.

Referring to FIG. 8, the control section 31 acquires a panorama image file (step 81). For example, the control section 31 acquires a panorama image file from a nonvolatile memory in the image display device 3, from a storage medium mounted on the image display device 3, or from another device via a network or the like, and stores the panorama image file in the panorama image file data Da.

Next, the control section 31 locates a left-eye three dimensional model and a right-eye three dimensional model, to which the panorama moving image is to be pasted, in the virtual space such that the centers of the three dimensional models are each positioned at the origin of the virtual space (step 82), and advances the processing operation to the next step. For example, in the case where the left-eye three dimensional model and the right-eye three dimensional model are cubic, the control section 31 locates the left-eye three dimensional model and the right-eye three dimensional model with respect to XYZ axes set in the virtual space, such that a front surface of each of the left-eye three dimensional model and the right-eye three dimensional model perpendicularly crosses the Z axis on the positive side of the Z axis, a rear surface of each of the left-eye three dimensional model and the right-eye three dimensional model perpendicularly crosses the Z axis on the negative side of the Z axis, a left side surface of each of the left-eye three dimensional model and the right-eye three dimensional model perpendicularly crosses the X axis on the positive side of the X axis, a right side surface of each of the left-eye three dimensional model and the right-eye three dimensional model perpendicularly crosses the X axis on the negative side of the X axis, a top surface of each of the left-eye three dimensional model and the right-eye three dimensional model perpendicularly crosses the Y axis on the positive side of the Y axis, and a bottom surface of each of the left-eye three dimensional model and the right-eye three dimensional model perpendicularly crosses the Y axis on the negative side of the Y axis.

Next, the control section 31 locates the left-eye virtual camera and the right-eye camera at the reference position with the initial attitude (step 83), and advances the processing operation to the next step. For example, the control section 31 sets the origin of the left-eye three dimensional model and the origin of the right-eye three dimensional model (i.e., the center of the left-eye three dimensional model and the center of right-eye three dimensional model) as the reference position of the left-eye virtual camera and the right-eye virtual camera, respectively. The control section 31 sets, as the initial attitude, the attitude with which xyz axes of the left-eye virtual camera and the right-eye virtual camera (the x-axis positive direction is the leftward direction of each virtual camera, the y-axis positive direction is the upward direction of each virtual camera, and the z-axis positive direction is the line-of-sight direction of each virtual camera) match the XYZ axes of the virtual space. Then, the control section 31 updates the data on the position and the attitude of each of the left-eye virtual camera and the right-eye virtual camera in the virtual camera data Dd by use of the reference position and the initial attitude of each of the left-eye virtual camera and the right-eye virtual camera.

Next, the control section 31 urges the user to adjust the attitude of the image display device 3 (step 84) and waits for the attitude to be adjusted (step 85). Until the attitude is adjusted, steps 84 and 85 are repeated. When the attitude is adjusted, the control section 35 advance the processing operation to step 86.

In step 86, the control section 31 sets the current attitude of the image display device 3 as the reference attitude, and advances the processing operation to the next step. For example, the control section 31 initializes the attitude of the image display device 3 (rotation amount from the reference attitude) represented by the attitude data Dc (i.e., the control section 31 sets the rotation amount about each axis to 0), and sets the resultant attitude as the reference attitude of the image display device 3.

As described above, in the processes in steps 84 through 86, the attitude of the image display device 3 at the time when the process in step 84 is performed or after elapse of a prescribed time length from such a time may be set as the reference attitude; the attitude of the image display device 3 when the user makes a prescribed operation may be set as the reference attitude; a predefined fixed attitude of the image display device 3 may be set as the reference attitude; or one of a plurality of predefined fixed attitudes may be selected by the user as the reference attitude.

Next, the control section 31 sets frame number n to 1 (step 87), and advances the processing operation to the next step.

Next, the control section 31 sets a display subject to be displayed on the image display device 3 from the panorama image file data Da (step 88), and advances the processing operation to the next step 91 (see FIG. 9). For example, the control section 31 may set a predefined panorama image as the display subject, or set a panorama image selected by the user as the display subject.

Referring to FIG. 9, the control section 31 acquires a left-eye panorama image and a right-eye panorama image corresponding to frame n, among the panorama image data of the panorama image file data Da regarding the panorama moving image as the display subject (step 91), and advances the processing operation to the next step.

Next, the control section 31 maps the left-eye panorama image and the right-eye panorama image acquired in step 91 on the inner surfaces of the left-eye three dimensional model and the right-eye three dimensional model (step 92), and advances the processing operation to the next step. For example, as described above, the panorama images are mapped to the inner surfaces of the respective three dimensional models, such that the reference directions set in the left-eye panorama image and the right-eye panorama image respectively match the reference directions of the left-eye three dimensional model and the right-eye three dimensional model.

Next, the control section 31 acquires data representing an output value of the gyrosensor 342 of the image display device 3 (step 93), and advances the processing operation to the next step. Data representing the output value of the gyrosensor 342 is stored in the angular velocity data Db1 at a cycle of a predetermined time length.

Next, the control section 31 uses the data acquired in step 93 to calculate the rotation direction and the rotation amount of the image display device 3 from the reference attitude (the rotation direction and the rotation amount after the initialization in step 86) (step 94), and advances the processing operation to the next step. For example, in step 94, the rotation direction and the rotation amount about each of prescribed axial directions of the image display device 3 at the reference attitude (in the example embodiment, the xt axis direction and the yt axis direction at the reference attitude) are calculated, and the attitude data Dc is updated. The rotation direction can be represented by whether the rotation amount has a positive value or a negative value. Therefore, only data representing the rotation amount may be stored in the attitude data Dc. For example, the control section 31 adds the rotation amount based on the angular velocity acquired in step 94 in the current process to the rotation amount calculated in step 94 in the immediately previous process to find a new rotation amount.

Next, the control section 31 rotates the attitude of the left-eye virtual camera and the right-eye virtual camera in the virtual space from the initial attitude by the rotation amount calculated in step 94 (step 95), and advances the processing operation to the next step. For example, the control section 31 rotates the attitude of the left-eye virtual camera and the right-eye virtual camera from the initial attitude about the X axis direction of the virtual space (x axis direction of the virtual camera at the initial attitude) by the amount same as the rotation amount of the image display device 3 about the xt axis direction calculated in step 94, and about the Y axis direction of the virtual space (y axis direction of the virtual camera at the initial attitude) by the amount same as the rotation amount of the image display device 3 about the yt axis direction calculated in step 94. Then, the control section 31 updates the data on the attitude of the left-eye virtual camera and the right-eye virtual camera in the virtual camera data Dd.

Next, the control section 31 generates images of the inner surfaces of the left-eye three dimensional model and the right-eye three dimensional model as viewed from the left-eye virtual camera and the right-eye virtual camera (left-eye virtual space image and right-eye virtual space image) (step 96), and advances the processing operation to the next step. For example, the control section 31 uses data representing the generated left-eye virtual space image and the generated right-eye virtual space image to update the virtual space image data De.

Next, the control section 31 displays the left-eye virtual space image and the right-eye virtual space image based on the virtual space image data De on the display section 35 stereoscopically (step 97), and advances the processing operation to the next step.

Next, the control section 31 increments the frame number n (step 98), and determines whether or not to finish the processing operation (step 99). A condition or finishing the processing operation may be, for example, that reproduction of an image of the final frame of the panorama moving image which is provided for reproduction is finished, that the user makes an operation of finishing the processing operation, or the like. When the processing operation is determined not to be finished, the control section 31 returns the processing operation to step 91 and repeats the above-described processes. When the processing operation is determined to be finished, the control section 31 finishes the processing operation of the flowcharts. Until it is determined in step 99 that the processing operation is to be finished, the series of processes in steps 91 through 99 are performed in repetition.

In the example described above, the rearward area synthesis processing operation and the dead angle area synthesis processing operation are performed before the panorama image is encoded and stored on the storage medium. Alternatively, the synthesis processing operations may be performed after the panorama image is decoded by the image display device 3. For example, after the panorama image file is acquired in step 81, the rearward area synthesis processing operation and the dead angle area synthesis processing operation may be performed on the left-eye panorama image and the right-eye panorama image of each frame. Still alternatively, when the left-eye panorama image and the right-eye panorama image are acquired in step 91, the rearward area synthesis processing operation and the dead angle area synthesis processing operation may be performed. Still alternatively, in the case where the virtual space image as viewed from the left-eye virtual camera and/or the right-eye virtual camera encompasses an image which is the target of the rearward area synthesis processing operation and the dead angle area synthesis processing operation in step 96, the rearward area synthesis processing operation and the dead angle area synthesis processing operation may be performed on the image.

In the example described above, the display range of the panorama image to be displayed on the display section 35 is changed in accordance with the attitude of the image display device 3. The display range may be changed in accordance with another operation. For example, in the case where a slide pad, an analog stick, a cross key, operation buttons or the like are provided as the input section 4, the display range may be changed in accordance with an operation made by such an operation unit. The attitude of the image display device 3 may be calculated based on only the angular velocity detected by the gyrosensor 342, based on only the acceleration detected by the acceleration sensor 341, or based on both of the angular velocity and the acceleration.

In the above description, the image display processing operation is performed by the image display device 3. Alternatively, at least a part of the processing operation in the above-described steps may be performed by another device. For example, in the case where the image display device 3 is structured to be communicable with another device (e.g., another server, another image display device, another game device, another mobile terminal), the processing operation in the above-described steps may be executed by a cooperation of the image display device 3 and such another device. In an example, the following case is conceivable: after operation data (angular velocity data) is output from the image display device 3 to another device and the processing operation of generating a virtual space image is performed by the another device, the virtual space image generated by the processing operation is displayed on the display section 35 of the image display device 3. Even when at least a part of the processing operation in the above-described steps is performed by another device in this manner, substantially the same processing operation as the above-described processing operation can be performed. Typically, the processing operation of performing the rearward area synthesis processing operation and the dead angle area synthesis processing operation to generate a left-eye panorama image and a right-eye panorama image is realized by execution of a prescribed program (image generation program) by a device, which is different from the image display device 3, for performing these image processing operations. Alternatively, at least a part of the processing operation may be performed by another device. The synthesis processing operation or the image display processing operation described above can be executed by one processor or a cooperation of a plurality of processors included in an information processing system including at least one information processing device. In the example described above, the control section 31 of the image display device 3 executes a prescribed program to realize the processing operation shown in the flowcharts described above. Alternatively, a part of, or the entirety of, the processing operation may be performed by a dedicated circuit included in the image display device 3. In the example described above, the device for performing the image processing operation executes a prescribed program to realize the rearward area synthesis processing operation and/or the dead angle area processing operation. Alternatively, a part of, or the entirety of, such a processing operation may be performed by a dedicated circuit included in the device.

According to the above-described modifications, the example embodiment can be realized in a system form of so-called cloud computing or a distributed system form of wide area network or local area network. For example, in the distributed system form of local area network, the above-described processing operation can be executed by a cooperation of a non-portable information processing device (non-portable game device) and a mobile information processing device (mobile game device). In these system forms, there is no specific limitation regarding which of the devices is to perform which of the steps described above. Regardless of how the processing operation is divided among the devices, the example embodiment can be realized, needless to say.

The processing order, set values, conditions for making determinations and the like which are used in the above-described information processing operations are mere examples, and the example embodiment can be realized with other orders, other values and other conditions, needless to say.

The image generation program and the image display program described above may be supplied to a device for performing the image processing operation or the image display device 3 via an external storage medium such as an external memory or the like, or via a wired or wireless communication circuit. The above-described programs may be stored in advance on a nonvolatile storage device in the above-mentioned device. Examples of the information storage medium for storing the programs include nonvolatile memories, CD-ROMs, DVDs, optical disc-type storage mediums similar thereto, flexible discs, hard discs, magneto-optical discs, magnetic tapes and the like. The information storage medium storing the programs may be a nonvolatile memory storing the programs. Such a storage medium is considered as a storage medium readable by a computer or the like. For example, it is possible to provide the above-described various functions by causing a computer or the like to read and execute the programs stored on these storage mediums.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

As described above, the example embodiment is usable for, for example, an image generation method, an image display method, an image generation program, an image generation system, an image display device and the like for the purpose of, for example, generating and/or displaying a stereoscopic panorama image.

What is claimed is:

1. An image generation method for generating a stereoscopic panorama image, comprising:
acquiring a left panorama image and a right panorama image respectively captured by a left panorama camera and a right panorama camera which are located so as to be away from each other by a prescribed distance;
synthesizing a rearward image area, of a rearward area, included in the right panorama image and captured by the right panorama camera to the left panorama image, instead of a rearward image area, of the rearward area, included in the left panorama image and captured by the left panorama camera;
synthesizing the rearward image area, of the rearward area, included in the left panorama image and captured by the left panorama camera to the right panorama image, instead of the rearward image area, of the rearward area, included in the right panorama image and captured by the right panorama camera; and generating the stereoscopic panorama image using the synthesized left panorama image as a left-eye image and using the synthesized right panorama image as a right-eye image.

2. The image generation method according to claim 1, further comprising:

synthesizing a rightward image area, of a rightward area, included in the right panorama image and captured by the right panorama camera to the left panorama image, instead of a rightward image area, of the rightward area, included in the left panorama image and captured by the left panorama camera; and synthesizing a leftward image area, of a leftward area, included in the left panorama image and captured by the left panorama camera to the right panorama image, instead of a leftward image area, of the leftward area, included in the right panorama image and captured by the right panorama camera;

wherein the stereoscopic panorama image is generated using, as the left-eye image, the left panorama image including the synthesized rightward image area of the rightward area captured by the right panorama camera and using, as the right-eye image, the right panorama image including the synthesized leftward image area of the leftward area captured by the left panorama camera.

3. The image generation method according to claim 1, further comprising:

synthesizing, instead of a right dead angle image area which is included in the left panorama image and in which an image of the right panorama camera is captured, an image area which is included in the right panorama image and corresponds to the right dead angle image area to the left panorama image; and synthesizing, instead of a left dead angle image area which is included in the right panorama image and in which an image of the left panorama camera is captured, an image area which is included in the left panorama image and corresponds to the left dead angle image area to right panorama image;

wherein the stereoscopic panorama image is generated using, as the left-eye image, the left panorama image including the synthesized image area corresponding to the right dead angle image area and using, as the right-eye image, the right panorama image including the synthesized image area corresponding to the left dead angle image area.

4. An image display method, comprising displaying, on a display device, the stereoscopic panorama image generated by the image generation method according to claim 1.

5. The image display method according to claim 4, further comprising setting a display range, of the stereoscopic panorama image, which is to be displayed on the display device in accordance with an attitude of the display device, wherein the set display range of the stereoscopic panorama image is displayed on the display device.

6. A non-transitory computer-readable storage medium storing an image generation program, the image generation program being executable by a computer included in an information processing device for generating a stereoscopic panorama image, wherein the image generation program allows the computer to execute:

acquiring a left panorama image and a right panorama image respectively captured by a left panorama camera and right panorama camera which are located so as to be away from each other by a prescribed distance;

synthesizing a rearward image area, of a rearward area, included in the right panorama image and captured by the right panorama camera to the left panorama image, instead of a rearward image area, of the rearward area, included in the left panorama image and captured by the left panorama camera;

synthesizing the rearward image area, of the rearward area, included in the left panorama image and captured by the left panorama camera to the right panorama image, instead of the rearward image area, of the rearward area, included in the right panorama image and captured by the right panorama camera; and generating the stereoscopic panorama image using the synthesized left panorama image as a left-eye image and using the synthesized right panorama image as a right-eye image.

7. An image generation system for generating a stereoscopic panorama image, comprising a processor system including at least one processor, the processor system being configured to at least:

acquire a left panorama image and a right panorama image respectively captured by a left panorama camera and a right panorama camera which are located so as to be away from each other by a prescribed distance;

synthesize a rearward image area, of a rearward area, included in the right panorama image and captured by the right panorama camera to the left panorama image, instead of a rearward image area, of the rearward area, included in the left panorama image and captured by the left panorama camera;

synthesize the rearward image area, of the rearward area, included in the left panorama image and captured by the left panorama camera to the right panorama image, instead of the rearward image area, of the rearward area, included in the right panorama image and captured by the right panorama camera; and generate the stereoscopic panorama image using the synthesized left panorama image as a left-eye image and using the synthesized right panorama image as a right-eye image.

8. An image display device for displaying a stereoscopic panorama image, comprising:

a display for displaying the stereoscopic panorama image by displaying a left-eye image and a right-eye image; and a display controller for displaying, on the display, a left panorama image and a right panorama image as the left-eye image and the right-eye image respectively, the left panorama image and the right panorama image being obtained as a result of exchanging a rearward image area of a rearward area, captured by a left panorama camera, included in a left panorama image captured by the left panorama camera, and a rearward image area of the rearward area, captured by a right panorama camera, included in a right panorama image captured by the right panorama camera.

9. The non-transitory computer-readable storage medium according to claim 6, wherein the image generation program further allows the computer to execute:

synthesizing a rightward image area, of a rightward area, included in the right panorama image and captured by the right panorama camera to the left panorama image, instead of a rightward image area, of the rightward area, included in the left panorama image and captured by the left panorama camera; and synthesizing a leftward image area, of a leftward area, included in the left panorama image and captured by the left panorama camera to the right panorama image, instead of a leftward image area, of the leftward area, included in the right panorama image and captured by the right panorama camera;

wherein the stereoscopic panorama image is generated using, as the left-eye image, the left panorama image including the synthesized rightward image area of the rightward area captured by the right panorama camera and using, as the right-eye image, the right panorama image including the synthesized leftward image area of the leftward area captured by the left panorama camera.

10. The non-transitory computer-readable storage medium according to claim 6, wherein the image generation program further allows the computer to execute:

synthesizing, instead of a right dead angle image area which is included in the left panorama image and in which an image of the right panorama camera is captured, an image area which is included in the right panorama image and corresponds to the right dead angle image area to the left panorama image; and synthesizing, instead of a left dead angle image area which is included in the right panorama image and in which an image of the left panorama camera is captured, an image area which is included in the left panorama image and corresponds to the left dead angle image area to right panorama image;

wherein the stereoscopic panorama image is generated using, as the left-eye image, the left panorama image including the synthesized image area corresponding to the right dead angle image area and using, as the right-eye image, the right panorama image including the synthesized image area corresponding to the left dead angle image area.

11. The image generation system according to claim 7, wherein the processor system is further configured to:

synthesize a rightward image area, of a rightward area, included in the right panorama image and captured by the right panorama camera to the left panorama image, instead of a rightward image area, of the rightward area, included in the left panorama image and captured by the left panorama camera; and synthesize a leftward image area, of a leftward area, included in the left panorama image and captured by the left panorama camera to the right panorama image, instead of a leftward image area, of the leftward area, included in the right panorama image and captured by the right panorama camera;

wherein the stereoscopic panorama image is generated using, as the left-eye image, the left panorama image including the synthesized rightward image area of the rightward area captured by the right panorama camera and using, as the right-eye image, the right panorama image including the synthesized leftward image area of the leftward area captured by the left panorama camera.

12. The image generation system according to claim 7, wherein the processor system is further configured to:

synthesize, instead of a right dead angle image area which is included in the left panorama image and in which an image of the right panorama camera is captured, an image area which is included in the right panorama image and corresponds to the right dead angle image area to the left panorama image; and synthesize, instead of a left dead angle image area which is included in the right panorama image and in which an image of the left panorama camera is captured, an image area which is included in the left panorama image and corresponds to the left dead angle image area to right panorama image;

wherein the stereoscopic panorama image is generated using, as the left-eye image, the left panorama image including the synthesized image area corresponding to the right dead angle image area and using, as the right-eye image, the right panorama image including the synthesized image area corresponding to the left dead angle image area.

13. The image display device according to claim 8, wherein the display controller is further configured to:

synthesize a rightward image area, of a rightward area, included in the right panorama image and captured by the right panorama camera to the left panorama image, instead of a rightward image area, of the rightward area, included in the left panorama image and captured by the left panorama camera; and synthesize a leftward image area, of a leftward area, included in the left panorama image and captured by the left panorama camera to the right panorama image, instead of a leftward image area, of the leftward area, included in the right panorama image and captured by the right panorama camera;

wherein the stereoscopic panorama image is generated using, as the left-eye image, the left panorama image including the synthesized rightward image area of the rightward area captured by the right panorama camera and using, as the right-eye image, the right panorama image including the synthesized leftward image area of the leftward area captured by the left panorama camera.

14. The image display device according to claim 8, wherein the display controller is further configured to:

synthesize, instead of a right dead angle image area which is included in the left panorama image and in which an image of the right panorama camera is captured, an image area which is included in the right panorama image and corresponds to the right dead angle image area to the left panorama image; and synthesize, instead of a left dead angle image area which is included in the right panorama image and in which an image of the left panorama camera is captured, an image area which is included in the left panorama image and corresponds to the left dead angle image area to right panorama image;

wherein the stereoscopic panorama image is generated using, as the left-eye image, the left panorama image including the synthesized image area corresponding to the right dead angle image area and using, as the right-eye image, the right panorama image including the synthesized image area corresponding to the left dead angle image area.

* * * * *